(12) United States Patent
Schafer et al.

(10) Patent No.: US 7,762,226 B2
(45) Date of Patent: Jul. 27, 2010

(54) METHOD FOR ADJUSTING A CAMSHAFT OF AN INTERNAL COMBUSTION ENGINE AND INTERNAL COMBUSTION ENGINE WITH AN ADJUSTABLE CAMSHAFT

(75) Inventors: Jens Schafer, Herzogenaurach (DE); Heiko Dell, Wustenrot (DE)

(73) Assignee: Schaeffler KG, Herzogenaurach (DE)

( * ) Notice: Subject to any disclaimer, the term of this patent is extended or adjusted under 35 U.S.C. 154(b) by 0 days.

(21) Appl. No.: 12/367,599

(22) Filed: Feb. 9, 2009

(65) Prior Publication Data

US 2009/0199807 A1 Aug. 13, 2009

(30) Foreign Application Priority Data

Feb. 8, 2008 (DE) .................. 10 2008 008 117

(51) Int. Cl.
*F01L 13/08* (2006.01)

(52) U.S. Cl. .............................. 123/182.1; 123/90.15

(58) Field of Classification Search .............. 123/182.1, 123/90.15
See application file for complete search history.

(56) References Cited

U.S. PATENT DOCUMENTS 7,278,385 B2 * 10/2007 Knecht et al. ............ 123/90.17

FOREIGN PATENT DOCUMENTS

| DE | 19743492 | 4/1999 |
| DE | 102004046182 | 4/2005 |
| DE | 10351891 | 6/2005 |
| DE | 102006012384 | 9/2007 |
| EP | 1586765 | 4/2004 |

\* cited by examiner

*Primary Examiner*—Hai H Huynh
(74) *Attorney, Agent, or Firm*—Volpe and Koenig, P.C.

(57) ABSTRACT

A method for adjusting a camshaft of an internal combustion engine during a stop phase and during a subsequent new startup phase of the internal combustion engine. Such methods are used, in particular, in so-called start-stop designs for combustion engines. The camshaft controls intake valves and/or exhaust valves of the internal combustion engine and is adjustable by a camshaft adjuster. By a desired startup position of the camshaft adjuster, control time points of the intake valves and/or the exhaust valves are defined in which mechanical work necessary for starting the internal combustion engine is reduced and/or pollutant emissions of the internal combustion engine are reduced. In the method according to the invention it is provided that the camshaft adjuster is set in a desired stop position during the stop phase. During a first section of the startup phase, the camshaft adjuster is set from the desired stop position into the desired startup position. During a second section of the startup phase, a setting of the camshaft adjuster is performed as a function of measured operating parameters of the internal combustion engine. Furthermore, the invention relates to an internal combustion engine with a camshaft that can be adjusted by a camshaft adjuster.

21 Claims, No Drawings

METHOD FOR ADJUSTING A CAMSHAFT OF AN INTERNAL COMBUSTION ENGINE AND INTERNAL COMBUSTION ENGINE WITH AN ADJUSTABLE CAMSHAFT

CROSS-REFERENCE TO RELATED APPLICATIONS

This application claims the benefit of DE 10 2008 008 117.5, filed Feb. 8, 2008, which is incorporated herein by reference as if fully set forth.

FIELD OF THE INVENTION

The invention relates to a method for adjusting a camshaft of an internal combustion engine during a stop phase and during a subsequent new startup phase of the internal combustion engine. Such methods are used, in particular, in so-called start-stop designs for combustion engines. In addition, the invention relates to an internal combustion engine with a camshaft that can be adjusted by a camshaft adjuster.

BACKGROUND

From the state of the art, different solutions for start-stop designs for internal combustion engines are known that are used, in particular, for saving fuel. In the case of a short-term stop, for example, a vehicle stopped in front of a red light or in a traffic jam, these designs stop the supply of fuel, whereby the operation of the combustion engine is interrupted. With such designs, the fuel consumption can be reduced by, for example, 3% to 5% relative to the new European driving cycle (NEFZ). Simultaneously, however, the realization of a start-stop design considerably increases the startup frequency to be specified. Under typical driving conditions, the expected startup frequency of a combustion engine of a motor vehicle increases from 50,000 to 3,000,000. In addition, start-stop designs initially lead to increased noise emissions, for example, an increase in the NVH level (Noise Vibration Harshness) in a motor vehicle. If the start-stop design is realized with the help of an electric starter motor, then the starter motor must be designed for the increased startup frequency. The starter motor must have larger dimensions, whereby the costs and mass of the starter motor increase. In addition, the power supply network in the motor vehicle is loaded for each startup process, whereby the alternator and the battery of the motor vehicle also must have larger dimensions. In addition, for each startup process, electrical energy must be expended, whereby the potential energy savings of the start-stop design are reduced.

Furthermore, from the state of the art, solutions are known in which the electrical starter motor is replaced partially or completely. Here, the startup of the combustion engine is realized by the ignition of fuel located in at least one of the cylinders of the stopped combustion engine. Such a startup is also designated as a direct startup. To be able to perform a direct startup, the piston of each cylinder must be located within a narrow crankshaft window that is set approximately 100° after the top dead center of the crankshaft.

From DE 103 51 891 A1, a method and a control device for restarting an internal combustion engine are known. The restart is realized during a current operating time period after the internal combustion engine had already been turned off at the end of a preceding operating time period. To allow the restarting of the internal combustion engine without a starter motor, fuel is initially injected into the intake pipe of the internal combustion engine, when its cylinder is located in an intake cycle during the last full revolution of the preceding operating time period, so that the combustion space of the cylinder is then filled with a fuel-air mixture. Furthermore, the piston of the cylinder transitions at the end of the preceding operating state into a standstill position in which the piston assumes a work cycle position and the fuel-air mixture remains enclosed in the combustion space. Finally, the restarting of the internal combustion engine is realized through the ignition of the fuel-air mixture enclosed in the combustion space, as long as the mixture is still combustible. One disadvantage of this method is that the transition of the piston of the cylinder into a standstill position requires precise positioning of the piston, wherein work for compressing the fuel-air mixture is to be performed.

EP 1 586 765 A1 shows a method and a control system for positioning a crankshaft when a combustion engine is turned off. In this way, an electric motor coupled with a crankshaft of the combustion engine is controlled, in order to position the crankshaft at a startup angle. The control system comprises a detection device for receiving and/or determining a positional angle and/or the rotational speed of the crankshaft and also a control unit that is suitable to control an electric motor in a control operating mode as a function of the rotational speed of the crankshaft and to move the crankshaft to the startup angle after the combustion engine stops. The combustion engine is started from this startup angle, wherein the control unit is configured so that the electric motor is controlled according to a control operating mode below a given limiting rotational speed in a controlled operation independent of the rotational speed, so that the crankshaft is adjusted to the startup angle. This solution has the disadvantage that the positioning of the crankshaft when the combustion engine is turned off is complicated and additional energy is also required for this positioning.

DE 197 43 492 A1 shows a method for starting an internal combustion engine, in particular, of a motor vehicle. This method is provided for an internal combustion engine that is provided with a piston that can move in a cylinder and that can pass through an intake phase, a compression phase, a work phase, and an exhaust phase. The fuel is injected directly into a combustion space defined by the cylinder and piston either in a first operating mode during the compression phase or in a second operating mode during the intake phase. According to this previously known method, for an initial injection the fuel is injected directly into the combustion space whose associated piston is located in the work phase. The power that can be generated with this method, however, is inadequate for starting the internal combustion engine in many cases.

From DE 10 2006 012 384 A1, a startup method for an internal combustion engine with direct injection is known that has, in a hybrid vehicle, an externally ignited combustion engine and an electric motor for its drive mechanism. The combustion engine is started from standstill without mechanical excitation, in that, with the electric motor, for driving the hybrid vehicle, at least one cylinder is brought into a suitable startup position between 30° and 150°, advantageously with a crank angle of between 70° and 90° according to its top dead center after the compression phase. A quantity of fuel is injected into this one or more cylinders and ignited after the injection. This method for realizing the start-stop design is limited to hybrid vehicles.

From DE 10 2004 046 182 A1, a method for the combustion-assisted start-stop operation of an engine with cylinder-valve shutdown is known. This method initially comprises a step for setting a throttle valve, in order to provide a mass flow of air to an engine of a vehicle that is sufficient for creating startup torque. Furthermore, the fuel that is sufficient for startup torque is injected into the cylinder of the engine during an intake cycle of a cylinder. In addition, the operation of a spark plug is interrupted and an exhaust valve and an intake valve of the cylinder are blocked. In this state, the engine is turned off. For turning on the engine, a piston of the cylinder is positioned between a top dead center of a compression cycle and a bottom dead center of a work cycle or between a top dead center of a discharge cycle and a bottom dead center of an intake cycle. A fuel-air charge that is sufficient for creating startup torque is ignited in the cylinder with the help of the spark plug. Finally, the intake valve and the exhaust valve are activated. This method also requires complicated positioning of the piston during the shutdown process of the engine, wherein mechanical work is required for compressing the fuel-air mixture. In addition, during the startup process it cannot be guaranteed with this method that the combustion of the fuel-air mixture is performed to a large degree ideally, so that the pollutant emissions are increased during the startup process.

SUMMARY

The objective of the present invention is to simplify the new startup of the internal combustion engine, for example, in the scope of a start-stop design of an internal combustion engine and/or reduce the pollutant emissions during the new startup.

This objective is met by a method according to the invention and by an internal combustion engine according to the invention.

DETAILED DESCRIPTION OF THE PREFERRED EMBODIMENTS

The method according to the invention is used for adjusting a camshaft of an internal combustion engine during a stop phase and during a new startup phase of the internal combustion engine. The camshaft controls intake valves and/or exhaust valves of the internal combustion engine. In this way, it can involve a camshaft in a simpler configuration that controls all of the intake valves and exhaust valves or it can involve a camshaft in a multiple-part configuration, wherein each individual camshaft controls only one part of the intake valves or exhaust valves. In principle, the camshaft controls the opening and closing of the intake valves and/or the exhaust valves. The camshaft is adjustable by a camshaft adjuster, so that the time points for the opening and closing of the intake valves and the exhaust valves are variable with respect to the position of a crankshaft of the internal combustion engine. The camshaft adjuster allows the adaptation of the internal combustion engine to different operating states and/or requirements to the internal combustion engine. Through a desired startup position of the camshaft adjuster, control time points of the intake valves and/or the exhaust valves are defined in which mechanical work required for starting the internal combustion engine is reduced and/or pollutant emissions of the internal combustion engine are reduced. The mechanical work required for starting the internal combustion engine are then reduced especially when the work for compressing a fuel-air mixture located in the cylinder is reduced, which is then the case, for example, when a smaller quantity of the fuel-air mixture is located in the cylinder in comparison with the conventional operation of the internal combustion engine. This can be achieved, for example, such that the intake valves close at a later time than is the case in normal operation. Simultaneously, in this way the pollutant emissions can be reduced. For the method according to the invention, it is provided that the camshaft adjuster is set into a desired stop position during the stop phase. In this way it is achieved that the camshaft adjuster is located in a defined position, so that this is then also known during the subsequent startup phase of the internal combustion engine, even if the position of the camshaft adjuster in the startup phase cannot yet be determined with the help of sensors. During a first section of the startup phase, the camshaft adjuster is set from the desired stop position into the desired startup position. This step allows a startup process of the internal combustion engine that is optimized with respect to the mechanical work required for startup and/or the resulting pollutant emissions. During a second section of the startup phase, the camshaft adjuster is set as a function of measured operating parameters of the internal combustion engine. In this way it is guaranteed that the continuous startup of the internal combustion engine can also be performed optimally with respect to the current operating state of the internal combustion engine. For this purpose, operating parameters of the internal combustion engine can be used that are not yet necessarily present during the first section of the startup phase.

One special advantage of the method according to the invention is that it can be used universally for internal combustion engines. The method can be applied, for example, in four-stroke engines according to the Otto principle. The method is suitable for start-stop designs independent of whether a starter motor is used or not. The method can be applied independent of the type of drive mechanism of the camshaft adjuster, for example, for electromotive or hydraulically driven camshaft adjusters. Furthermore, the method is also suitable for combustion engines in which no start-stop design is realized. In such combustion engines, the method according to the invention also leads to a reduction in fuel consumption.

If the method according to the invention is used for a combustion engine with a starter motor, then the starter motor can have smaller dimensions. In this way, less installation space is needed for the starter motor and the total costs are reduced. In the case of belt-driving starter motors, the load on the belt is reduced. The efficiency of the total system is increased, because less work is to be performed for the startup process. In this way, for example, the loading of a voltage-supply network of the motor vehicle is simultaneously reduced.

If the method according to the invention is used in the scope of a start-stop design, then there is furthermore the advantage that the direct startup can also be performed at higher and lower operating temperatures of the combustion engine in comparison with realizations according to the state of the art.

The present invention touches upon the knowledge that through the selection of the control time points of the intake valves and the exhaust valves, the cylinder filling and the residual gas percentage can be influenced. In addition, the effective compression ratio can be influenced by the selection of the control time points. Finally, through the selection of the control time points, in particular, through the selection of the time point for closing the intake valves, the work for compressing the fuel-air mixture can be influenced. Up to the closing of the intake valves, a piston moving from the bottom dead center up to the top dead center can push the air or the fuel-air mixture into an intake pipe of the combustion engine essentially free from loading. Therefore, the work to be performed for compressing the fuel-air mixture finally located in the cylinder is reduced. Simultaneously, the mechanical work necessary for starting the internal combustion engines is reduced.

In one preferred embodiment of the method according to the invention, the desired startup position and the desired stop position are identical. Thus, the camshaft adjuster is already brought into the desired startup position that allows an optimum startup during the stop phase of the internal combustion engine. Alternatively, the method can be constructed so that the desired startup position lies close to the desired stop position, in order to be able to quickly set the desired startup position during the first section of the startup phase.

In one preferred embodiment of the method according to the invention, the desired stop position is defined by a stop of the camshaft adjuster. This can be, for example, one of those stops that cause the most advanced control time points or the most retarded control time points of the intake valves and the exhaust valves. Setting the camshaft adjuster up to a stop is used for guaranteeing a defined, desired stop position, in order to allow secure setting of a camshaft adjuster in the desired startup position during the first section of the startup phase.

Through the desired stop position, preferably a retarded time point for closing the exhaust valves and an advanced time point for opening the intake valves are defined. This leads to too large an overlap of the work phases of the internal combustion engine and to a high residual gas percentage during the combustion in the cylinder of the internal combustion engine. Finally, in this way the startup process of the internal combustion engine is influenced, because the quantity of fuel-air mixture in the cylinder is fixed at the beginning of the startup process.

Through the desired startup position, a retarded time point for closing the intake valves is defined. In this way, the quantity of the fuel-air mixture to be charged into the cylinder is reduced, so that furthermore the effective compression ratio is reduced. An advanced or retarded time point is understood to be a time point that lies at a more advanced or more retarded position in the time sequence relative to the time point in the conventional operation of the combustion engine.

For a preferred embodiment of the method according to the invention, the setting of the camshaft adjuster into the desired stop position begins during the stop phase exactly when a signal made available via a data bus is provided for stopping and/or the rotational speed of the internal combustion engine falls below a defined value. For example, an engine controller can transmit a stop flag via a controller area network (CAN) that signals the intention to stop the combustion engine. Another signal that signals a stop of the combustion engine can be triggered when the rotational speed of the internal combustion engine falls below a defined value. The presence of one of the two signals or both signals has the result that the camshaft adjuster is set into the desired stop position. The desired stop position is to be held up to the end of the stop phase, i.e., up to the standstill of the crankshaft. If it cannot be guaranteed that the camshaft adjuster is set completely into the desired stop position during the stop phase, then in a special embodiment of the method according to the invention, a measured value for the last achieved position of the camshaft adjuster can be stored in a memory. During the startup phase of the internal combustion engine, the stored value is used as a starting point, in order to set the camshaft adjuster into the desired startup position.

In a preferred embodiment of the method according to the invention, the setting of the camshaft adjuster during the second section of the startup phase is performed continuously. Thus, already during the second section of the startup phase a continuous adaptation of the internal combustion engine to the current operating parameters can be performed. The internal combustion engine therefore can be transitioned quickly into the desired operating mode, whereby the startup behavior of the internal combustion engine is improved even more.

The setting of the camshaft adjuster during the second section of the startup phase is performed advantageously as a function of the rotational speed of the crankshaft, the rotational speed of the camshaft, and/or the rotational speed of an electric motor for driving the camshaft adjuster. This embodiment of the method according to the invention is especially suitable for internal combustion engines in which a camshaft adjuster driven with an electric motor is used. Three rotational speeds can be measured that give information on the current position of the camshaft adjuster. The rotational speed of the camshaft and the rotational speed of the crankshaft can be set at a defined time point at a ratio from which the phase angle between the camshaft and the startup phase can be derived. If the rotational speed of the camshaft cannot be measured during the startup phase or during the stop phase, then the rotational speed of the electric motor can be measured from which the phase between the camshaft and the crankshaft can be determined via a triple-shaft gearbox relationship. This phase can be checked as soon as there is a new measurement value on the rotational speed of the camshaft. During the startup phase, measurement values for the rotational speed of the crankshaft, the camshaft, and the electric motor for driving the camshaft adjuster are often available only above a certain minimum rotational speed. In these cases, below this minimum rotational speed, the phase between the camshaft and the crankshaft cannot always be determined. In order to bring the camshaft adjuster into the desired startup position or to hold it in the desired startup position, the electric motor can be moved in the direction of the desired startup position that is defined, for example, by a stop, wherein this process can be performed, for example, by setting the voltage or the current for operating the electric motor or with reference to pulse-width modulation. As soon as measurement values for the rotational speeds of the crankshaft and the electric motor are available, the desired startup position can be maintained exactly. In the second section of the startup phase, the position of the camshaft adjuster can be adapted continuously to the rotational speeds or other operating parameters. If the desired startup position cannot be set with enough precision, then the camshaft adjuster can again be moved to a stop, in order to obtain an exact starting position. During this process, fuel is not injected, so that the work for compressing the cylinder volume remains low.

In order to be able to measure the fuel correctly during the startup phase, it must be known which cylinder is located in a charge-transfer phase and in which position the piston and intake valve are located relative to each other. If this is not known, then injection is performed into an arbitrarily chosen cylinder. This leads, in particular, to high emissions of hydrocarbons during the startup phase. As soon as the rotational speeds of the camshaft and the crankshaft can be measured during the startup phase and these can be synchronized with each other, a proper control of the intake valves and the exhaust valves can be performed with respect to the position of the piston.

Advantageously, the setting of the camshaft adjuster is already performed during the second section of the startup phase like during continuous operation of the internal combustion engine. This leads to a short startup phase and to a low NVH level during the startup phase.

In a preferred embodiment of the method according to the invention, the desired startup position is defined as a function of the current operating parameters of the internal combustion engine. These operating parameters can be, for example, measured values for temperatures of cooling water, motor oil, and/or intake air and also for atmospheric air pressure and/or air humidity and/or for a combustion ratio λ of the internal combustion engine. In this way, the new startup can be adapted to the current state of the internal combustion engine, whereby the mechanical work necessary for starting the internal combustion engine and/or the pollutant emissions of the internal combustion engine can be reduced even more during the startup phase.

Advantageously, the desired startup position represents an optimum between the reduction of the mechanical work necessary for starting the internal combustion engine and the reduction of the pollutant emissions of the internal combustion engine during the startup phase. In many applications, for example, in automotive engineering, it is desired to minimize both parameters, in order, on one hand, to be able to save fuel and in order, on the other hand, to reduce the emission of pollutants. The method according to the invention permits both goals to be reached, for which, however, an optimum is to be selected that is defined by the desired startup position.

Setting the camshaft adjuster is performed during the second section of the startup phase preferably such that the second section of the startup phase is shortened and/or that noises of the internal combustion engine generated during the startup phase are reduced. In this way, the method satisfies the requirements, especially for the realization of start-stop designs.

The method according to the invention is also suitable for internal combustion engines that are formed by a V-type engine. V-type engines involve reciprocating piston engines in which cylinders are arranged in two rows or so-called cylinder banks. The one or more camshafts control the intake valves and/or the exhaust valves of cylinders of both cylinder banks. The one or more of the camshafts are each adjustable by one of the camshaft adjusters. The one or more camshaft adjusters are set according to the method according to the invention. In this way, the method is used preferably for those V-type engines in which the intake valves are controlled by a first of the camshafts and the exhaust valves are controlled by a second of the camshafts. The first camshaft is adjustable by a first of the camshaft adjusters. The second camshaft is adjustable by a second of the camshaft adjusters. The setting according to the invention of the first camshaft by the first camshaft adjuster and the setting according to the invention of the second camshaft by the second camshaft adjuster are preferably performed in sync, wherein a deviation between the first camshaft and the second camshaft has a window width of 0 to 3 degrees cam angle, i.e., relative to the rotational angle position of the first and the second camshafts. This window width equals, in an especially preferred way, from 0 to 1.5 degrees and in a very especially preferred way from 0 to 0.5 degrees.

The internal combustion engine according to the invention initially has a camshaft for controlling intake valves and exhaust valves of the internal combustion engine. Here, it can involve a camshaft in a simpler configuration that controls all of the intake valves and exhaust valves or it can involve a camshaft in a multiple-part configuration, wherein each individual camshaft controls only one part of the intake valves or exhaust valves. In principle, the camshaft controls the opening and closing of the intake valves and the exhaust valves. The camshaft is adjustable by a camshaft adjuster, so that the time points for the opening and closing of the intake valves and the exhaust valves are variable with respect to the position of a crankshaft of the internal combustion engine. The camshaft adjuster is controlled by a camshaft controller. In a stop phase of the internal combustion engine, the camshaft controller allows a setting of the camshaft adjuster in a desired stop position, in order to bring the camshaft into a defined position, so that this is then also known during a subsequent startup phase of the internal combustion engine, even if the position of the camshaft adjuster in the startup phase cannot yet be determined with the help of sensors. During a first section of the startup phase, the camshaft controller allows the setting of the camshaft adjuster from the desired stop position into a desired startup position. Control time points of the intake valves and the exhaust valves in which mechanical work necessary for starting the internal combustion engine is reduced and/or pollutant emissions of the internal combustion engine are reduced, are defined by the desired startup position of the camshaft adjuster. This step allows a startup process of the internal combustion engine that is optimized with respect to the mechanical work necessary for startup and/or the resulting pollutant emissions. During a second section of the startup phase, the camshaft controller allows a setting of the camshaft adjuster as a function of measured operating parameters of the internal combustion engine. In this way it is guaranteed that the continuous startup of the internal combustion engine is optimized with respect to the current operating state of the internal combustion engine. For this purpose, measured operating parameters of the internal combustion engine can be used that are not yet absolutely available during the first section of the startup phase.

The inventive internal combustion engine shows all the advantages and fields of application of the method according to the invention for adjusting a camshaft of an internal combustion engine during a stop phase and during a new startup phase of the internal combustion engine. All of the described embodiments of the method according to the invention for adjusting a camshaft can also be realized for embodiments of the internal combustion engine according to the invention.

The invention claimed is:

1. A method for adjusting a camshaft of an internal combustion engine during a stop phase and during a subsequent new startup phase of the internal combustion engine, wherein intake valves and/or exhaust valves of the internal combustion engine are controlled by the camshaft that is adjusted with a camshaft adjuster, and wherein control time points of the intake valves and/or the exhaust valves are defined by a desired startup position of the camshaft adjuster in which mechanical work necessary for starting the internal combustion engine is reduced and/or pollutant emissions of the internal combustion engine are reduced, the method comprising the following steps:

setting the camshaft adjuster in a desired stop position during the stop phase, setting the camshaft adjuster from a desired stop position to the desired startup position during a first section of the startup phase, and setting the camshaft adjuster as a function of measured operating parameters of the internal combustion engine during a second section of the startup phase.

2. The method according to claim 1, wherein the desired startup position and the desired stop position are identical.

3. The method according to claim 1, wherein the desired stop position is defined by a stop of the camshaft adjuster.

4. The method according to claim 1, wherein a retarded time point for closing the exhaust valves and an advanced time point for opening the intake valves are defined by the desired stop position.

5. The method according to claim 1, wherein a retarded time point for closing the intake valves is defined by the desired startup position.

6. The method according to claim 1, wherein the setting of the camshaft adjuster into the desired stop position begins during the stop phase when at least one of an engine-shutdown electronic signal made available by a data bus is provided or a rotational speed of the internal combustion engine falls below a defined value.

7. The method according to claim 1, wherein a measured value for the position of the camshaft adjuster at the end of the stop phase is stored in a memory, if it cannot be guaranteed that the camshaft adjuster is set completely in the desired stop position.

8. The method according to claim 1, wherein the setting of the camshaft adjuster is performed continuously during the second section of the startup phase.

9. The method according to claim 1, the setting of the camshaft adjuster is performed during the second section of the startup phase as a function of at least one of a rotational speed of a crankshaft, a rotational speed of the camshaft, or a rotational speed of an electric motor for driving the camshaft adjuster.

10. The method according to claim 9, wherein the setting of the camshaft adjuster is performed during the second section of the startup phase in the same way as during continuous operation of the internal combustion engine.

11. The method according to claim 1, wherein the desired startup position is defined as a function of current operating parameters of the internal combustion engine.

12. The method according to claim 11, the desired startup position is defined as a function of measured values for at least one of temperatures of cooling water, motor oil, or intake air, as well as for air pressure or a combustion air ratio of the internal combustion engine.

13. The method according to claim 1, wherein the desired startup position represents an optimum between a reduction of the mechanical work necessary for starting the internal combustion engine and a reduction of the pollutant emissions of the internal combustion engine.

14. The method according to claim 1, wherein the setting of the camshaft adjuster is performed during the second section of the startup phase such that at least one of the second section of the startup phase is shortened or noises of the internal combustion engine produced during the startup phase are reduced.

15. The method according to claim 1, wherein the engine is a V-type engine with two cylinder banks, wherein at least one of the intake valves or the exhaust valves of cylinders of both cylinder banks of the V-type engine are controlled by one or more of the camshafts, and the one or more of the camshafts are each adjustable by one of the camshaft adjusters.

16. The method according to claim 15, wherein the intake valves are controlled by a first of the camshafts and that the exhaust valves are controlled by a second of the camshafts, wherein the first camshaft is adjustable by a first of the camshaft adjusters and wherein the second camshaft is adjustable by a second of the camshaft adjusters.

17. The method according to claim 16, wherein the setting of the first camshaft by the first camshaft adjuster and the setting of the second camshaft by the second camshaft adjuster are performed in sync, wherein a deviation between the first camshaft and the second camshaft has a window width of 0 to 3 degrees relative to a rotational angle position of the first camshaft and the second camshaft.

18. The method according to claim 17, wherein the deviation between the first camshaft and the second camshaft has a window width of 0 to 1.5 degrees relative to the rotational angle position of the first camshaft and the second camshaft.

19. The method according to claim 18, wherein the deviation between the first camshaft and the second camshaft has a window width of 0 to 0.5 degrees relative to the rotational angle position of the first camshaft and the second camshaft.

20. An internal combustion engine comprising a camshaft that can be adjusted by a camshaft adjuster for controlling intake valves and exhaust valves of the internal combustion engine and a camshaft controller for controlling the camshaft adjuster, the camshaft controller:
  in a stop phase of the internal combustion engine, sets the camshaft adjuster into a desired stop position,
  in a first section of a subsequent new startup phase of the internal combustion engine, sets the camshaft adjuster from the desired stop position into a desired startup position, wherein, through the desired startup position, control time points of the intake valves and the exhaust valves are defined in which at least one of mechanical work necessary for starting the internal combustion engine is reduced or pollutant emissions of the internal combustion engine are reduced, and
  in a second section of the new startup phase, sets the camshaft adjuster as a function of measured operating parameters of the internal combustion engine.

21. The internal combustion engine according to claim 20, wherein the engine is a V-type engine.

* * * * *